April 2, 1963

G. E. GATHERS 3,084,270

POLE FACE WINDING CONNECTIONS

Filed Oct. 4, 1961

INVENTOR.
GLEN E. GATHERS
BY Robert H Montgomery
ATTORNEY

United States Patent Office 3,084,270
Patented Apr. 2, 1963

3,084,270
POLE FACE WINDING CONNECTIONS
Glen E. Gathers, Erie, Pa., assignor to General Electric Company, a corporation of New York
Filed Oct. 4, 1961, Ser. No. 142,825
7 Claims. (Cl. 310—183)

This invention relates to an improved multiple connection for individually electrically connecting each of a plurality of relatively positioned terminal elements to a complementary plurality of conductive connecting elements and maintaining such connections and connectors in predetermined spaced relation.

The connection of the invention may be useful in a wide variety of electrical applications; however, it is particularly adaptable for providing connections between pole face bars of dynamoelectric machines to form pole face windings, and is therefore described in that environment.

In rotating direct current (D.C.) machinery, current in the armature windings sets up a magnetomotive force (M.M.F.) independent of the main field windings which alters both the distribution and the magnitude of the flux which would be produced by the main field windings alone. This production of armature M.M.F. is referred to as armature reaction. Armature reaction, if not properly compensated, may cause sparking and inefficient commutation of the armature conductors. In some D.C. machines, armature reaction is neutralized by the provision of compensating or pole face windings. These windings comprise coil sides imbedded in slots in the faces of the main poles, and have a number of ampere turns proportional to the number of ampere turns in the armature circuit. The pole face conductors are connected in series with the armature circuit and connection is so made that every pole face conductor carries current in the opposite direction to an adjacent conductor on the armature.

Pole face windings generally comprise conductor bars imbedded in the pole face and extending therefrom at opposite ends of the poles. The ends of selected conductors are joined to form the windings. Since the pole face windings carry full armature current, good electrical contact must be made between the terminal ends of the pole face bars and the connectors therebetween. It is desirable that connections may be easily assembled, inspected and replaced, and since the terminals are closely spaced, it is important that the connecting means be simple and compact enough to allow assembly and disassembly in the limited space available.

Several connecting arrangements are known to the prior art. However, each of such arrangements has shortcomings which the present invention overcomes. Perhaps the most common arrangement is to utilize a separate nut and bolt for each terminal, but such arrangement usually has the disadvantage of requiring flat head screws, countersunk holes and offset terminal ends for each connection. Such arrangement requires a large number of parts and requires considerable assembly and dissasembly time.

Another arrangement for making the connections is by welding or brazing, which has the advantage of making a good electrical connection, but the disadvantage of making assembly and dissasembly or replacement time-consuming.

In a third known arrangement, which is an adaptation of the bolting and welding arrangements, additional members are welded to the terminals so as to provide additional working surface to facilitate individual bolt connections. This third arrangement incorporates some of the disadvantages of the first two.

Accordingly, it is a principal object of the present invention to provide an improved multiple electrical connection for individually connecting each of a plurality of relatively positioned terminal elements to a complementary one of a plurality of conducting elements, and maintaining said connections and connectors in predetermined spaced relation with each other.

It is a further object of the invention to provide such a multiple electric connection which is simple in design and facilitates assembly, inspection and disassembly.

Another object of the invention is to provide a more simple and economical connection between selected conductor bars of a dynamoelectric machine to form electrical windings thereon.

Another and more specific object of the invention is to provide improved and more economical connections between pole face conductors of direct current machines to provide pole face windings therefor.

Briefly stated, the invention in one form thereof comprises a plurality of spaced-apart pole face conductors having terminal ends extending from pole face slots in a dynamoelectric machine, a like plurality of electrically conductive connecting elements, and a fastening means to individually connect each terminal end to a selected one of the conducting elements. Each of the terminal ends has a respective aligned aperture, and each of the connecting elements is connected to a respective one of the terminal ends. More specifically, a slotted end portion of each connecting element is associated with the apertured end of a respective one of the terminal elements. An electrically insulated bolt is passed through the aligned apertures of the terminal ends and insulating spacers positioned between the associated terminal ends. The slotted ends of the connecting elements are positioned over the fastening means in contact with its respective terminal end. When the bolt is tightened, the connecting elements are firmly held against their respective terminal ends. The insulating spacers properly space all connections and distribute clamping forces exerted by the bolt therebetween.

The novel features of the invention are particularly pointed out and distinctly claimed in the claims appended to and forming part of this specification. However, the invention may be most easily appreciated by reference to the following description and drawings of a preferred embodiment thereof wherein:

Figure 2:
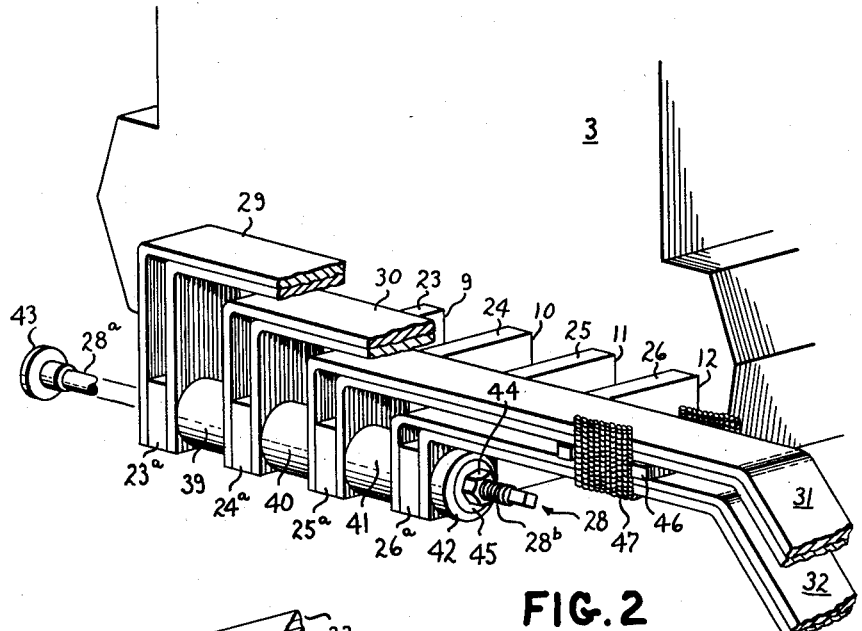
FIGURE 2 shows a perspective view of a portion of a stator in a dynamoelectric machine and pole face windings thereon embodying the invention.
Figure 1:
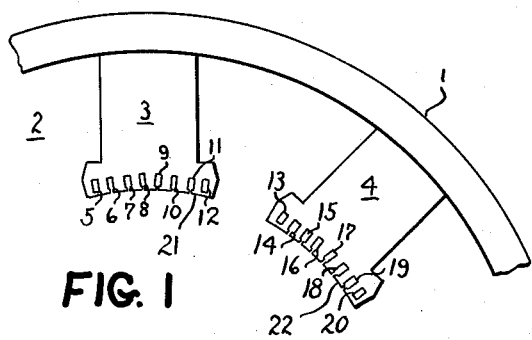
FIGURE 1 illustrates a portion of a stator of a D.C. dynamoelectric machine.

Referring now to the drawings, FIG. 1 shows a portion of a stator 1 of a dynamoelectric machine 2. The machine is illustrated in part as a six-pole machine, but only main field poles 3 and 4 are illustrated. Each of the poles 3 and 4 has pole face conductor bar slots 5 through 12 and 13 through 20 respectively therein adjacent to pole faces 21 and 22 respectively. The number of slots per pole are chosen for illustration only and do not represent a particular machine design. However, it will be noted that individual slots of each group of slots 5–8, 9–12, 13–16 and 17–20 are made mutually parallel. Each field pole has field coils thereabout, not shown. Reference is now made to FIG. 2 which illustrates in perspective a connection embodying the invention in association with pole 3. Pole face conductor bars 23, 24, 25 and 26 extending from slots 9, 10, 11 and 12 respectively are arranged to be connected to pole face conductor bars, not shown, receivable in slots 13, 14, 15 and 16 of pole 4, FIG. 1. The conductor bars provide pole face winding coil sides and the connections between such bars on adjacent poles comprise pole face winding end turns.

It should be recognized that in the illustrated environment the invention is described for only a portion of the pole face conductors in pale 3. Additional conductors are receivable in slots 5, 6, 7 and 8, not visible in FIG. 2, which would be connected to pole face conductors in the pole counterclockwise adjacent to pole 3 in the manner hereinafter disclosed. Also, as is well known to one skilled in the art, the pole face bars extend from both ends of their slots in the stator poles and appropriate connections are made therebetween at both ends of the machine. Each of the extending or terminal ends 23a, 24a, 25a and 26a of pole face conductors 23, 24, 25 and 26 respectively have apertures 27 (see FIG. 4) therein which are aligned to receive an insulated bolt 28 therethrough.

Figure 3:
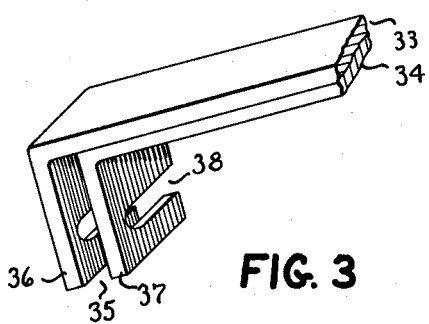
FIGURE 3 is a perspective view of a portion of the connecting element of FIGURE 2.

A plurality of preformed connectors 29, 30, 31 and 32 are shown each connected to one of the terminal ends of conductors 23, 24, 25 and 26. As illustrated, each of the pole face conductor-connecting elements comprises two conductors 33 and 34 so formed or laminated as to provide a bifurcated end portion 35 which closely fits over the apertured end portion of a terminal end of a selected pole face conductor. As can be seen in the perspective view of an end of one of the connecting elements, FIG. 3, each arm 36 and 37 of bifurcated portion 35 is provided with a slot 38 which is arranged in alignment with the aperture of the associated terminal end 23a, 24a, 25a or 26a. The arms 36 and 37, when compressed as hereinafter described, make a good electrical contact with their respective sides of their terminal ends.

Insulated bolt 28 or other suitable fastening means is passed through the aligned apertures of the terminal ends 23a, 24a, 25a and 26a and through the slots 38 of the connectors 29, 30, 31 and 32 respectively. Bolt 28 also carries a plurality of spacer means 39, 40, 41 and 42 of insulating material, one each of which is positioned between the respective associated terminal elements and connecting elements. For example, spacer 39 is positioned between elements 29 and 30. The insulators 39, 40, 41 and 42 serve the function of separating, spacing and insulating the connecting elements and distributing clamping forces from the insulated bolt 28 to the respective associated terminal ends of the pole face bars.

The terminal ends 23a–26a of pole face bars 23–26 and connecting elements 29–32, all respectively, are connected together and held in good electrical connection by means of compressive forces exerted by the clamping means comprising bolt 28 and nuts threadeadably positioned on each end thereof. Preferably a T nut 43 is threadably received on end 28a, shown in exploded perspective, of bolt 28. The T nut is preferred because it may be socketed with the aperture of terminal end 23a and slot 38 of connector 29 and thereby conserve space. A nut 44 is threadably received on end 28b of shaft 28 adjacent to a Belleville washer 45. It is thus seen that tightening of the nuts 43 and 44 compresses the structure therebetween and provides good electrical connection between the pole face bars and the end turn connectors.

The bolt 28 is appropriately insulated along its length, for example, with a glass tape or sleeve or other suitable means, to insulate each connection from the others.

In assembly, the bolt 28 is inserted through the apertured terminals 23a–26a of the pole face bars 23–26 respectively, with the insulating spacers 39, 40, and 41 inserted therebetween, and spacer 42, washer 45 and nut 44 are placed on end 28b of bolt 28, if not done previously.

The end turn connectors 29–32 which may be previously assembled, properly spaced and secured by means of insulating blocks 46 (only one shown), and suitable non-conductive binding means 47 then have their slotted end portions 35 positioned over their associated terminal ends 23a–26a. The opposite ends of connectors 29–32, not shown, are simultaneously connected to associated pole face bars, not shown, which have their terminal ends extending from slots 13–16 of pole 4, FIG. 1. The nuts 43 and 44 are then tightened to the desired tension.

It will be apparent that a set of connecting elements forming pole face windings and turns may be assembled together to their associated coil sides and also removed as a set. The connecting elements 29–32 may be formed of two laminated conductors as illustrated, or may comprise a single conductor which would contact only one side of a pole face bar. If a particular machine should require two conductors per slot, the construction shown in FIG. 4 may be utilized.

Figure 4:
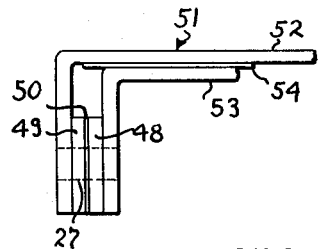
FIGURE 4 shows a modified form of an end conductor terminal which is capable of receiving two terminals or conductor bars.

In FIG. 4, a pair of pole face bars 48 and 49 are shown separated by a layer of insulating material 50; likewise, end turn connector 51 comprises formed conductors 52 and 53 which are separated by an insulator 54. This structure provides two turns per pole face slot.

The ease of assembly of the connectors to and disassembly from the pole face bars is believed to be readily apparent. The easily removable connectors facilitate inspection and cleaning of the pole face bars and connectors. Moreover, any maintenance or repair operations which involve main poles, commutating poles, commutating coils, or pole face bars usually necessitate disassembly of pole face connectors. The present invention decreases such maintenance time resulting in more productive use of machines embodying the invention.

For simplicity of disclosure, the connectors have been described as connecting only pole face bars. However, those skilled in the art will quickly recognize that in assembly of a D.C. machine, some of the connectors will be connected to commutating pole leads, inasmuch as the commutating pole windings are in series with the pole face windings.

It will be apparent that various modifications may be made to the embodiment of the invention chosen for purpose of disclosure. For example, slots could be provided in the terminal ends of the pole face bars and apertures provided in the connecting elements forming the end turns, in which case the spacers, bolt and clamping means would be assembled on the connectors 29, 30, 31 and 32 prior to assembly of the end turns on the coil sides.

While a preferred form of the invention has been described and illustrataed, other modifications of the invention may occur to those skilled in the art which do not depart from the spirit and scope of the invention. Therefore, it is intended to cover in the appended claims all changes and modifications of the invention which do not depart from the spirit and scope of the invention.

What is claimed as new and is desired to be secured by Letters Patent of the United States is:

1. In a dynamoelectric machine having a frame with salient poles extending therefrom and pole face windings on said poles to compensate for armature reaction, the improvement comprising:

(a) a series of aligned slots generally parallel to the axis of said machine in one of the poles;

(b) first conductor bars in said slots having terminal ends extending therefrom, apertures defined in the ends of said first bars, said apertures being aligned;

(c) a second series of aligned slots in a second pole adjacent said one of the poles;

(d) second conductor bars in the slots of said second series of slots having terminal ends extending therefrom, apertures defined in the ends of said second bars, said apertures being aligned;

(e) a first insulated bolt extending through said apertures in said first bars, insulating spacers on said first bolt between said first bars;

(f) a second insulating bolt extending through said apertures in said second bars, insulating spacers on said second bolt between said second bars;

(g) a plurality of connectors each for connecting a bar of said first bars to a bar of said second bars;

(h) each of said connectors being preformed and having bifurcated ends with aligned slots therein adapted to be fitted over the terminal ends of the bars which it connects with said slots receiving said bolts therein between a side of a bar and a spacer;

(i) and means cooperating with each of said bolts for simultaneously clamping each of said connectors to its contacting pole face bars.

2. In a dynamoelectric machine having a frame with salient poles extending therefrom and pole face windings on said poles to compensate for armature reaction, the improvement comprising:
   (a) a series of aligned slots generally parallel to the axis of said machine in one of the poles;
   (b) first conductor bars in said slots having terminal ends extending therefrom, apertures defined in the ends of said first bars, said apertures being aligned;
   (c) a second series of aligned slots in a second pole adjacent said one of the poles;
   (d) second conductor bars in the slots of said second series of slots having a terminal ends extending therefrom, apertures defined in the ends of said second bars, said apertures being aligned;
   (e) a first insulated bolt extending through said apertures in said first bars, insulating spacers on said first bolt between said first bars;
   (f) a second insulated bolt extending through said apertures in said second bars, insulating spacers on said second bolt between said second bars;
   (g) a plurality of connectors each for connecting a bar of said first bars to a bar of said second bars;
   (h) each of said connectors being preformed and having ends with apertures therein adapted to fit over said bolts and being in contact with the terminal ends of the bars it connects with said slots receiving said bolts between a side of a bar and a spacer;
   (i) and means cooperating with each of said bolts for simultaneously clamping each of said connectors to its contacting pole face bars.

3. In a dynamoelectric machine having a frame with salient poles extending therefrom and pole face windings on said poles to compensate for armature reaction, the improvement comprising:
   (a) a series of slots generally parallel to the axis of said machine in one of the poles;
   (b) first conductor bars in said slots having terminal ends extending therefrom, apertures defined in the ends of said first bars, said apertures being aligned;
   (c) a second series of slots in a second pole adjacent said one of the poles;
   (d) second conductor bars in the slots of said second series of slots having terminal ends extending therefrom, apertures defined in the ends of said second bars, said apertures being aligned;
   (e) a first insulated bolt extending through said apertures in said first bars, insulating spacers on said first bolt between said first bars;
   (f) a second insulated bolt extending through said apertures in said second bars, insulating spacers on said second bolt between said second bars;
   (g) a plurality of connectors each for connecting a bar of said first bars to a bar of said second bars;
   (h) each of said connectors being preformed and having ends with aligned slots therein adapted to be fitted over said bolts and in contact with the terminal ends of the bars it connects with said slots receiving said bolts between a side of a bar and a spacer;
   (i) and means cooperating with each of said bolts for simultaneously clamping each of said connectors to its contacting pole face bars.

4. A pole face winding comprising a plurality of conductor bars having terminal ends extending from adjacent poles of a dynamoelectric machine, said terminal ends defining aligned apertures therein, an insulated bolt extending through the apertures, insulating spacers on said bolt between said terminal ends, a plurality of connectors of like number to said bars, each of said connectors having bifurcated ends, said bifurcated ends having aligned slots therein, said connector end slots being fitted over said insulated bolt on either side of a pole face bar between said pole face bar and a spacer, means cooperating with said bolt for simultaneously clamping each of said connectors to its associated pole face bar.

5. A pole face winding comprising a plurality of conductor bars having terminal ends extending from adjacent poles of a dynamoelectric machine, said terminal ends defining aligned apertures therein, an insulated bolt extending through the apertures, insulating spacers on said bolt between said terminal ends, a plurality of connectors of like number to said bars, each of said connectors having ends with apertures therein, each of said connector end apertures being fitted over said insulated bolt in contact with a pole face bar between said pole face bar and a spacer, and means cooperating with said bolt for simultaneously clamping each of said connectors to its associated pole face bar.

6. A multiple electric connection comprising: a plurality of spaced-apart terminal elements, each of said elements having a respective aligned aperture near one end thereof, a plurality of connecting elements, each of said connecting elements to be connected to a respective one of said terminal elements, each of said connecting elements having an end portion associated with the apertured end of a respective one of said terminal elements, an insulated fastening means passing through the aligned apertures of said terminal elements, and spacer means carried by said fastening means and positioned between respective ones of said associated terminal elements and connecting elements to thereby distribute clamping forces from said fastening element to the respective associated terminal and conducting elements.

7. A multiple electric connection comprising: a plurality of spaced-apart terminal elements, each of said elements having a respective aligned aperture near one end thereof, a plurality of connecting elements, each of said connecting elements to be connected to a respective one of said terminal elements, each of said connecting elements having a bifurcated end portion associated with the apertured end of a respective one of said terminal elements, said end portion of each of said conducting elements having a slot to be aligned with the aperture of the associated terminal element, insulated fastening means passing through the aligned apertures of said terminal elements and the slots of said connecting elements associated therewith, and spacer means carried by said fastening means and positioned between respective ones of said associated terminal elements and connecting elements, to thereby distribute clamping forces from said fastening element to the respective associated terminal and conducting elements.

No references cited.